United States Patent
Youngs et al.

(10) Patent No.: US 9,106,477 B1
(45) Date of Patent: Aug. 11, 2015

(54) ANONYMOUS CALLING

(75) Inventors: Simon Youngs, Overland Park, KS (US); Gary D. Koller, Overland Park, KS (US); Piyush Jethwa, Overland Park, KS (US); Michael P. McMullen, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 454 days.

(21) Appl. No.: 12/768,400

(22) Filed: Apr. 27, 2010

(51) Int. Cl.
G06F 15/16 (2006.01)
H04L 29/06 (2006.01)

(52) U.S. Cl.
CPC ....... *H04L 29/06653* (2013.01); *H04L 63/0407* (2013.01)

(58) Field of Classification Search
CPC ............ H04L 63/0407; H04L 63/0421; H04L 29/06639; H04L 29/06653; H04L 29/06646
USPC .......................................... 709/204, 205, 207
See application file for complete search history.

(56) References Cited

U.S. PATENT DOCUMENTS

| | | | |
|---|---|---|---|
| 2002/0086659 A1* | 7/2002 | Lauper | 455/404 |
| 2007/0030824 A1* | 2/2007 | Ribaudo et al. | 370/328 |
| 2007/0130122 A1* | 6/2007 | Warren | 707/3 |
| 2007/0239693 A1* | 10/2007 | Hellmuth et al. | 707/3 |
| 2007/0293212 A1* | 12/2007 | Quon et al. | 455/420 |
| 2009/0010404 A1* | 1/2009 | Zazza | 379/93.01 |
| 2009/0143052 A1* | 6/2009 | Bates et al. | 455/414.2 |
| 2010/0015991 A1* | 1/2010 | Evans et al. | 455/456.1 |
| 2010/0299431 A1* | 11/2010 | Vanderhook et al. | 709/224 |
| 2011/0138302 A1* | 6/2011 | Schleifer | 715/753 |
| 2011/0159861 A1* | 6/2011 | Pratt et al. | 455/417 |

\* cited by examiner

*Primary Examiner* — Dhairya A Patel (57) ABSTRACT

Embodiments of the present invention provide systems, methods, and computer-readable media for initiating anonymous communication between a first user and a second user. In particular, an anonymous communication request is transmitted from a first user to a session management node. The anonymous communication request may include search criteria provided by the first user. Based on the search criteria, the session management node many generate a query to a profile server. The profile server may identify a second user based on the search criteria provided by the first user. Additionally, the profile server may provide an identifier of the second user to the session management node. Further, the session management node may initiate anonymous communication between the first user and the second user.

14 Claims, 7 Drawing Sheets

ANONYMOUS CALLING

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed Description section. This summary is not intended to identify key features of the claimed subject matter, nor is it intended to be used as an aid in isolation to determine the scope of the claimed subject matter.

There are many situations where strangers benefit from sharing information. In particular, there are many situations where strangers benefit from sharing information within the context of similar circumstances, such as community-edited web pages (e.g., a shared interest in a topic), social networking sites (e.g., shared friends), or even just asking a stranger on the street for directions (e.g., a shared geographic reference point). However, mobile device users are not able to interact with other mobile device users who are strangers within a context of similar circumstances. As such, it would be beneficial to enable mobile device users to initiate phone calls and share information with strangers who have similar interests, particularly when the strangers share contextual information.

In a first aspect, a set of computer-usable instructions provide a method of initiating anonymous communication between a first user and a second user. The method includes transmitting a call request from the first user to be connected to a second user matching a first set of criteria provided by the first user. An anonymous identifier of the second user is received based on the second user matching the first set of criteria. Further, anonymous communication is initiated between the first user and the second user.

In a second aspect, another set of computer-usable instructions provide a method of initiating anonymous communication between a first user and a second user. The method comprises receiving a call request from the first user to be connected to a second user matching a first set of criteria provided by the first user. Further, the second user matching the first set of criteria is identified. An anonymous identifier of the second user is then provided to the first user to be used in initiating anonymous communication between the first user and the second user.

In a third aspect, a further set of computer-usable instructions provide a method of initiating anonymous communication between a first user and a second user. The method comprises receiving a call request from the first user within a first geographic area to be connected to a second user in a second geographic area. The call request includes a first set of criteria provided by the first user. The method further comprises identifying the second user in the second geographic area matching the first set of criteria. An anonymous identifier of the second user is then provided to the first user to be used in initiating anonymous communication between the first user and the second user.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

CD Compact Disc
CD-ROM Compact Disk Read Only Memory
DVD Digital Versatile Discs
EEPROM Electrically Erasable Programmable Read Only Memory
GPS Global Positioning System
MP3 MPEG-1 Audio Layer 3
PC Personal Computer
PDA Personal Digital Assistant
RAM Random Access Memory
ROM Read Only Memory Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for initiating anonymous communication between a first user and a second user. In particular, an anonymous communication request is transmitted from a first mobile device associated with the first user to a session management node. The anonymous communication request may include search criteria provided by the first user. Based on the search criteria, the session management node may generate a query to a profile server. The profile server may identify a second user based on the search criteria provided by the first user. Additionally, the profile server may provide the query results that include an identifier of the second user to the session management node. Further, the session management node may initiate anonymous communication between the first user and the second user.

As discussed above, there are situations where a person may benefit from information that is provided by a stranger. For example, when a person is visiting a new city, he may rely on restaurant reviews posted to online blogs by strangers. Additionally, when a person is looking to buy a car, he may look at experiences of strangers to get a broad spectrum of car reviews. However, reading reviews from strangers lacks the benefit of having a responsive, real-time conversation with a person. Further, there are situations where it is not possible to safely devote the time or attention needed to look up text-based reviews posted by strangers. For example, if a person is driving, it is probably not possible for him to safely read text-based reviews.

Additionally, some information is so specific to a person's situation that it may be difficult or impossible to receive accurate up-to-the-minute information. For instance, if a person is driving and sees a traffic jam, it may be difficult for him to access information relating to that particular traffic jam through an internet search query. As such, methods are provided for establishing anonymous communication with strangers who may provide beneficial information to a user. In particular, methods are provided for establishing anonymous communication with strangers who meet criteria provided by the user.

A large amount of beneficial information may be gained from strangers who share a geographic context with a user. For instance, if a tourist walking around New York City is lost, he may ask a passing stranger for directions. Similarly, if a mobile device user driving through unknown territory is lost, he may desire to ask a nearby stranger for directions. Accordingly, a session management node may be used to initiate anonymous communication between a user of a first mobile device and a user of a second mobile device who has a shared context with the user of the first mobile device. In order to locate strangers who are within proximity of the first mobile device, however, the location of the first mobile device must first be determined.

The location of the first mobile device may be input by the user of the first mobile device. Alternatively, the location of the first mobile device may be determined by transmitting a location request from the session management node to the first mobile device. Alternatively, the location of the first mobile device may be determined based on the location of the mobile device as assessed by a recent ping of devices within a particular area of a network. To ping a computing device, such as a mobile device, a small amount of information is sent to the computing device over a network. A location of the computing device may be determined based on information received in the response to the ping. As such, if a user associated with a first mobile device is lost, his location may be determined based on pinging the first mobile device.

Further, other mobile devices that are within a particular geographic area of the first mobile device may be determined by pinging any mobile device within the particular geographic area that is on the same network as the first mobile device. For instance, if a user associated with the first mobile device requests to be connected with a stranger who is within ten square miles of the first mobile device, the network may ping all mobile devices within ten square miles of the first mobile device. Based on identifying information of the set of mobile devices that are active within the ten square mile area, the session management node may determine whether there is a mobile device, such as the second mobile device, that is associated with a user that is willing to allow another user associated with another mobile device, such as the first mobile device, to initiate anonymous communication between the first mobile device and the second mobile device. For example, if the second mobile device is registered to receive anonymous communication with another mobile device, the session management node may initiate communication between the first mobile device and the second mobile device. In alternative embodiments, the session management node may query a user of the second mobile device to determine whether the user of the second mobile device is willing to participate in anonymous communication with the first mobile device. If the user of the second mobile device is willing to participate in anonymous communication, the session management node may initiate communication between the first mobile device and the second mobile device.

In alternative embodiments, a request to initiate anonymous communication received from a first mobile device may include a category of the request, description of the nature of the request, or both. For instance, if a user associated with the first mobile device is interested in asking directions of a user associated with a mobile device, a description of the question may be included in the anonymous communication request. Further, that information may be presented to a second user who meets geographic criteria provided by the first user. Based on the category or description of the request, the second user may decide whether to participate in an anonymous communication related to that category or description.

A first user may also use methods of initiating anonymous communication to communicate with a stranger driving in a nearby car. For instance, if there is a traffic jam and the first user is near to a semi-truck, the first user may request to anonymously communicate with the driver of the semi-truck to ask if the truck driver can see the end of the traffic jam from his position above the road. In order to be connected to the correct truck driver, the first user may include search criteria within his request to initiate anonymous communication with the truck driver. For instance, the first user may include the license plate of the semi-truck, physical aspects of the vehicle (color, make, model, or size, etc.), a general location (highway, interstate, mile marker, town, or city, etc.) of the truck, speed of the truck, or a combination of the provided factors. Based on the search criteria, a session management node may determine whether the truck driver is available to engage in anonymous communication with the first caller.

Anonymous communication between a first user and a second user may be initiated by receiving an anonymous communication request from the first user. In particular, a computing device associated with the first user may transmit an anonymous communication request to a session management node. A session management node processes anonymous communication requests and manages queries associated with the processing of anonymous communication requests. Further, the session management node also directs and initiates the anonymous communications between callers, such as the first user and the second user.

In embodiments, the computing device may be a mobile device. Additionally, the anonymous communication request may be initiated by the first user associated with the mobile device through the input of a DTMF tone, a keyword, or both, into the mobile device. Once an anonymous communication request has been received at the session management node, the session management node may generate a request for search criteria associated with the anonymous communication request. The session management node may transmit the request to the first user. Alternatively, the first user may include search criteria in the anonymous communication request. For example, the search criteria may include location-based information, such as a GPS location of a desired second user.

Upon receipt of the search request criteria at the session management node, the session management node may generate a query to a location server. The location server is a server that has access to the location of mobile devices within a particular area of a network. In order to maintain up-to-date information, the location server may ping mobile devices within the particular area of the network every hour. Based on the hourly ping results, the location server may generate a set of a plurality of mobile device users who are within a threshold area of the GPS location of the desired second user as provided by the first user.

The location server may then ping the plurality of mobile devices to generate a first set of mobile devices that meet the location-based requirements referenced in the anonymous communication search request received at the session management node from the first user. In embodiments, the location server may ping the plurality of mobile devices twice in quick succession to receive two location points for each mobile device that may be used to approximate a speed at which each of the plurality of mobile devices is travelling. The speed at which each mobile device is travelling may be used to further narrow the first set of mobile devices.

Further, once the first set of mobile devices has been determined, a set of users may be further determined based on the first set of mobile devices. In particular, a set of users may be determined based on the first set of criteria provided by the first user. The session management node may determine the set of users by generating queries to servers that store or have access to non-location-based aspects of user profiles. For example, the session management node may query a profile server to determine further information relating to the users associated with the first set of mobile devices.

A profile server is used to store profile information of each user registered at a network. In embodiments, a mobile device may transfer profile information of a user(s) associated with the mobile device to the profile server upon joining a particular area of the network. Additionally, the profile information may include user preferences of being engaged in anonymous communication. For instance, a user may prefer to engage in anonymous communication during business hours. This may be especially important to an owner of a restaurant who is trying to promote the restaurant to visitors of the city. Further, a user may prefer to only engage in anonymous calling when a user inputs a particular keyword into the anonymous communication request. For instance, a candy shop owner may agree to engage in anonymous calling when the category entered has the word "chocolate" or "sugar."

Based on information received from the profiling server, the session management node may determine a set of users. Further, if there is difficulty determining the set of users, or if there is difficulty prioritizing the set of users, the session management node may receive additional distinguishing information associated with the first user by querying a registration server. The registration server may be used to receive profile information from users associated with mobile devices. In particular, the session management node may query the profile information related to the first user from the registration server.

Further, the session management node may utilize profile information related to the first user to break ties in prioritizing the set of users, if needed. As such, once a set of users has been determined, a second user may be identified based on at least a portion of the information received and processed as discussed above. Alternatively, a list of the set of users or a portion of the list of the set of users may be provided to the first user. In accordance with embodiments of the present invention, the list of the set of users may be given anonymous identifiers to protect the identities of the set of users. Alternatively, the first user may only be exposed to certain aspects of the set of users, such as interests, age, location, etc. Under this example, the first user may choose the second user from the list of the set of users or a portion of the list of the set of users. Once the user has chosen a second user, the decision may be transmitted to the session management node. Further, the session management node may initiate anonymous communication between the first user and the second user.

Figure 1:
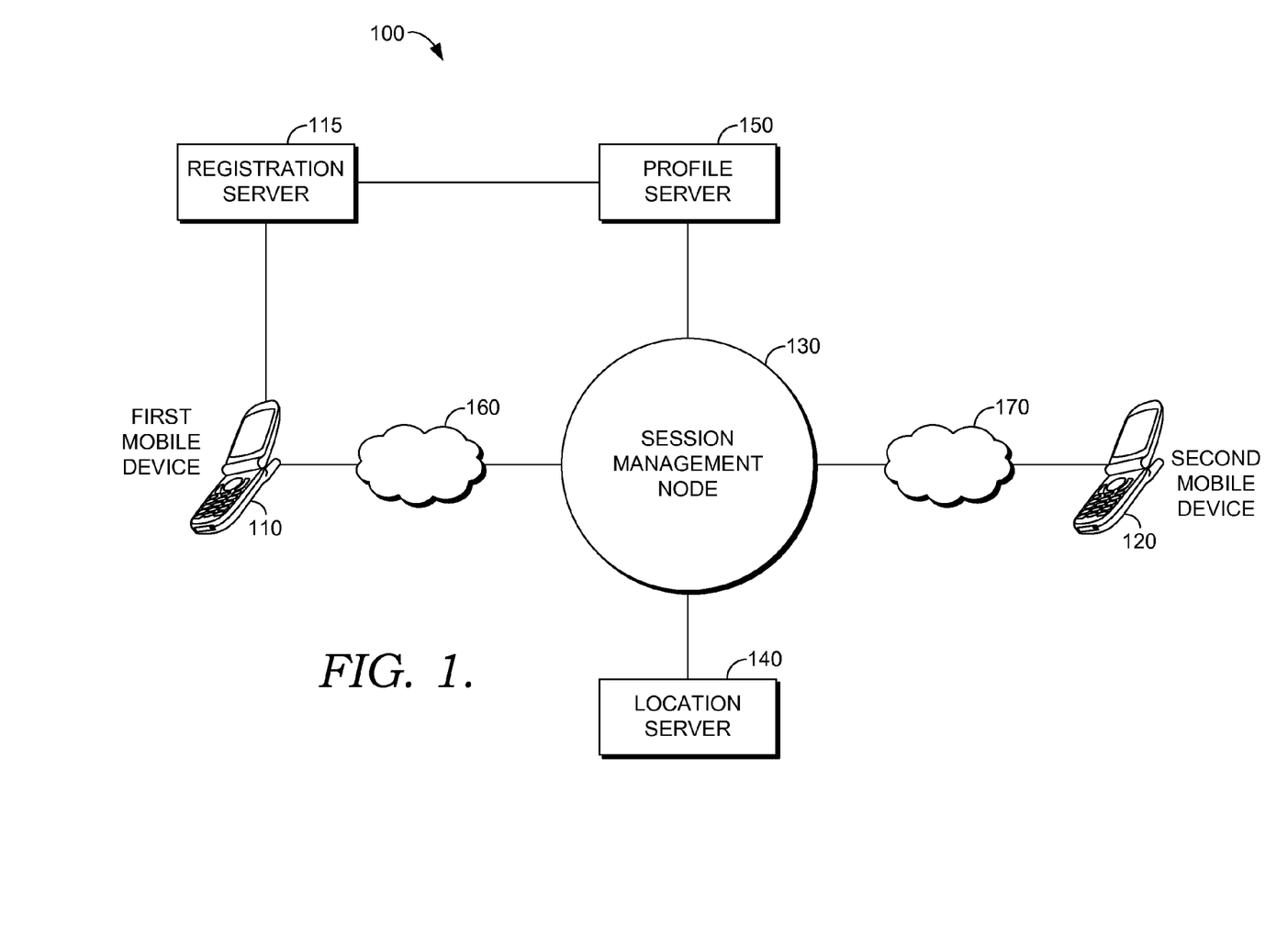
FIG. 1 is a block diagram illustrating a computing system for initiating anonymous communication between a first user and a second user, in accordance with an embodiment of the present invention.

Turning now to FIG. 1, a block diagram illustrating a system for initiating anonymous communication between a first user and a second user is provided, in accordance with an embodiment of the present invention. As shown in FIG. 1, computing system 100 includes a first mobile device 110, a registration server 115, a second mobile device 120, a session management node 130, a location server 140, and a profile server 150. The first mobile device 110 and second mobile device 120 can communicate by way of networks 160 and 170. Networks 160 and 170 can be wired, wireless, or both. Networks 160 and 170 can be combined to form a single network or can include multiple networks, as well as being a network of networks, but is shown in more simple form so as to not obscure other aspects of the present invention. For example, networks 160 and 170 may include one or more wide area networks (WANs), one or more local area networks (LANs), one or more public networks, such as the Internet, one or more private networks, or a combination of the networks described above. Networks 160 and 170 may include an array of devices, which are not shown so as to not obscure more relevant aspects of the invention. In a wireless telecommunications network, components such as a base station, a communications tower, or access points (as well as other components) can provide wireless connectivity. Although single components are illustrated for clarity, one skilled in the art will appreciate that networks 160 and 170 can enable communication between any number of computing devices, such as mobile devices.

First mobile device 110, second mobile device 120, or both can be any mobile device that is capable of communication, web accessibility, or both. As such, first mobile device 110, second mobile device 120, or both may take on a variety of forms, such as a personal computer (PC), a laptop computer, a mobile phone, a personal digital assistance (PDA), a MP3 player, a video player, a handheld communications device, a workstation, any combination of these devices, or any other device that is capable of communication, web accessibility, or both. In one embodiment, first mobile device 110, second mobile device 120, or both are mobile devices that utilize a wireless telecommunications network to communicate. Manufacturers of illustrative mobile devices include, for example, Research in Motion® of Waterloo, Canada; Creative Technologies Corp. of Brooklyn, N.Y.; Samsung® of Seoul, Korea; Nokia® of Espoo, Finland; LG® of Seoul, Korea; Motorola® of Schaumburg, Ill.; and Apple® Computer of Cupertino, Calif. A mobile device can include, for example, a display, a processor, a power source (e.g., a battery), a data store, a speaker, memory, a buffer.

A computing device, such as first mobile device 110, may request to initiate anonymous communication with another mobile device, such as second mobile device 120. In embodiments, first mobile device 110 may provide information relating to the location and preferences associated with the first mobile device 110 to a registration server 115. The location of first mobile device 115 may be updated based on a network's periodic ping of mobile device users who are within the network. In particular, as first mobile device 110 moves from base station to base station of a network, the location of the first mobile device 110 may be provided to the registration server 115.

Figure 2:
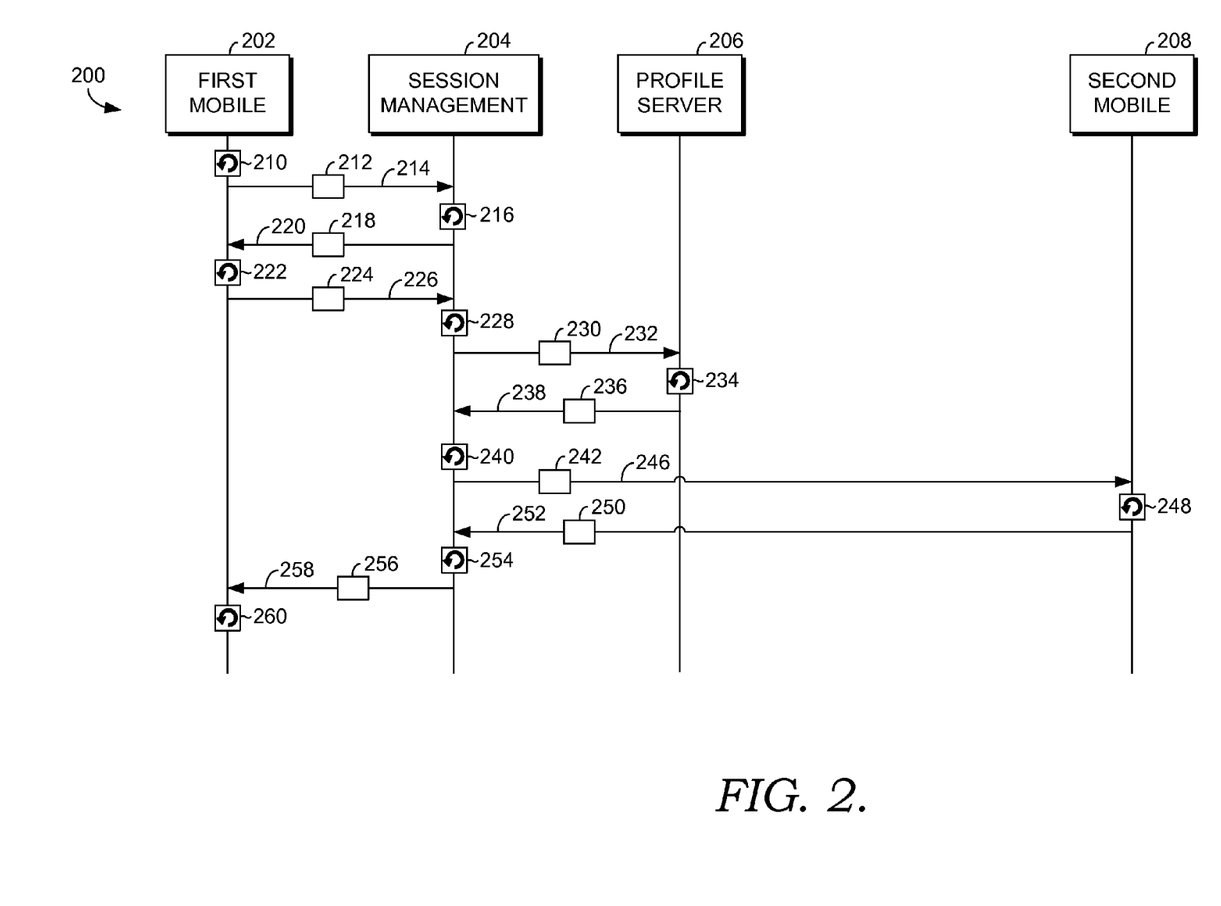
FIG. 2 is a process flow diagram of a process for initiating anonymous communication between a first mobile device and a second mobile device, in accordance with an embodiment of the present invention.

FIG. 2 is a process flow diagram 200 of a process for initiating anonymous communication between a first mobile device and a second mobile device, in accordance with an embodiment of the present invention. Initially, first mobile device 202 generates 210 an anonymous communication request 212. First mobile device 202 transmits 214 anonymous communication request 212 to session management node 204. At 216, session management node 204 generates a search criteria request 218. The search criteria request 218 is transmitted 220 to first mobile device 202. In response to receiving 222 search criteria request 218, first mobile device 202 generates 222 response 224. In particular, response 224 includes search criteria provided by a first user associated with first mobile device 202. Response 224 is then transmitted 226 to session management node 204.

Once session management node 204 receives 228 search criteria from first mobile device 202, session management node 204 generates 228 a profile query 230. Profile query 230 is transmitted 232 to profile server 206 where profile server 206 is queried 234 to find a second user matching the search criteria provided by the first user associated with first mobile device 202. Once the second user has been identified, profile server 206 generates 234 a query response 236 that includes identifying information about the second user. The query response 236 is transmitted 238 to session management node 204. At 240, session management node 204 initiates a call request 242 that is communicated 246 to the second mobile device 208 associated with the second user. In response, a call response 250 is generated 248 at the second mobile device 208. The call response 250 includes information that the second user associated with second mobile device 208 accepts the call request 242 from session management node 204. In alternative embodiments, the second user may decline to participate in a call. Call response 250 is then transmitted 252 to session management node 204. At 254, session management node 204 generates a call request 256. Call request 256 is transmitted 258 to first mobile device 202. At 260, first mobile device 202 accepts the call request 256.

Figure 3:
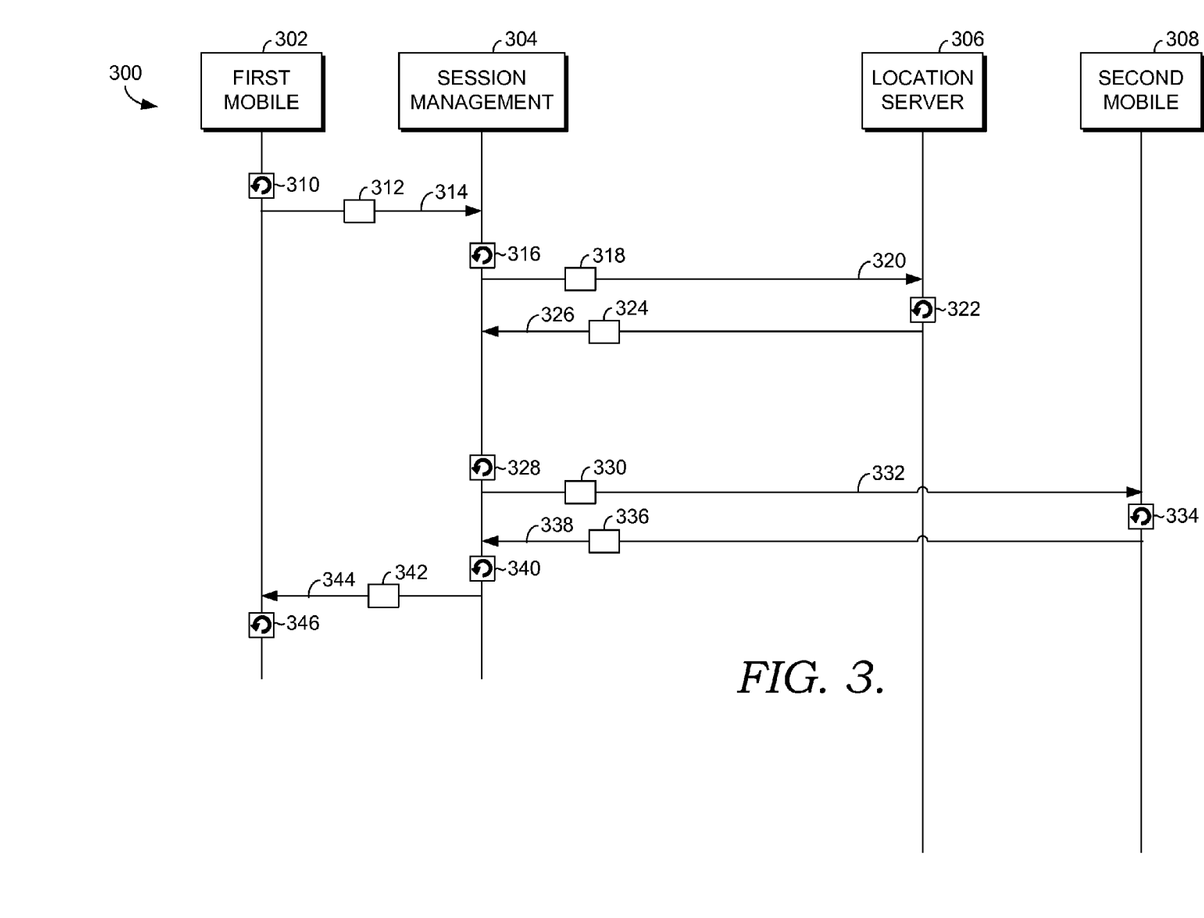
FIG. 3 is another process flow diagram of a process for initiating anonymous communication between a first mobile device and a second mobile device, in accordance with an embodiment of the present invention.

FIG. 3 is another process flow diagram 300 of a process for initiating anonymous communication between a first mobile device and a second mobile device, in accordance with an embodiment of the present invention. Initially, first mobile device 302 generates 310 an anonymous communication request 312. First mobile device 302 transmits 314 anonymous communication request 312 to session management node 304. In embodiments, anonymous communication request 312 includes search criteria provided by a first user associated with first mobile device 302. The search criteria may be used to determine a second user associated with second mobile device 308.

Once session management node 304 receives 316 search criteria from first mobile device 302, session management node 304 generates 316 a location query 318. Location query 318 is transmitted 320 to location server 306 where location server 306 is queried 322 to find a second user matching the search criteria provided by the first user associated with first mobile device 302. Once a second user has been identified, location server 306 generates 322 a query response 324 that includes identifying information about the second user. The query response 324 is transmitted 326 to session management node 304.

At 328, session management node 304 initiates a call request 330 that is communicated 332 to second mobile device 308 associated with the second user. In response, a call response 336 is generated 334 at second mobile device 308. The call response 336 includes information that the second user associated with second mobile device 308 accepts the call request 330 from session management node 304. In alternative embodiments, the second user may decline to participate in a call. Call response 336 is then transmitted 338 to session management node 304. At 340, session management node 304 generates a call request 342. Call request 342 is transmitted 344 to first mobile device 302. At 346, first mobile device 302 accepts the call request 342.

Figure 4:
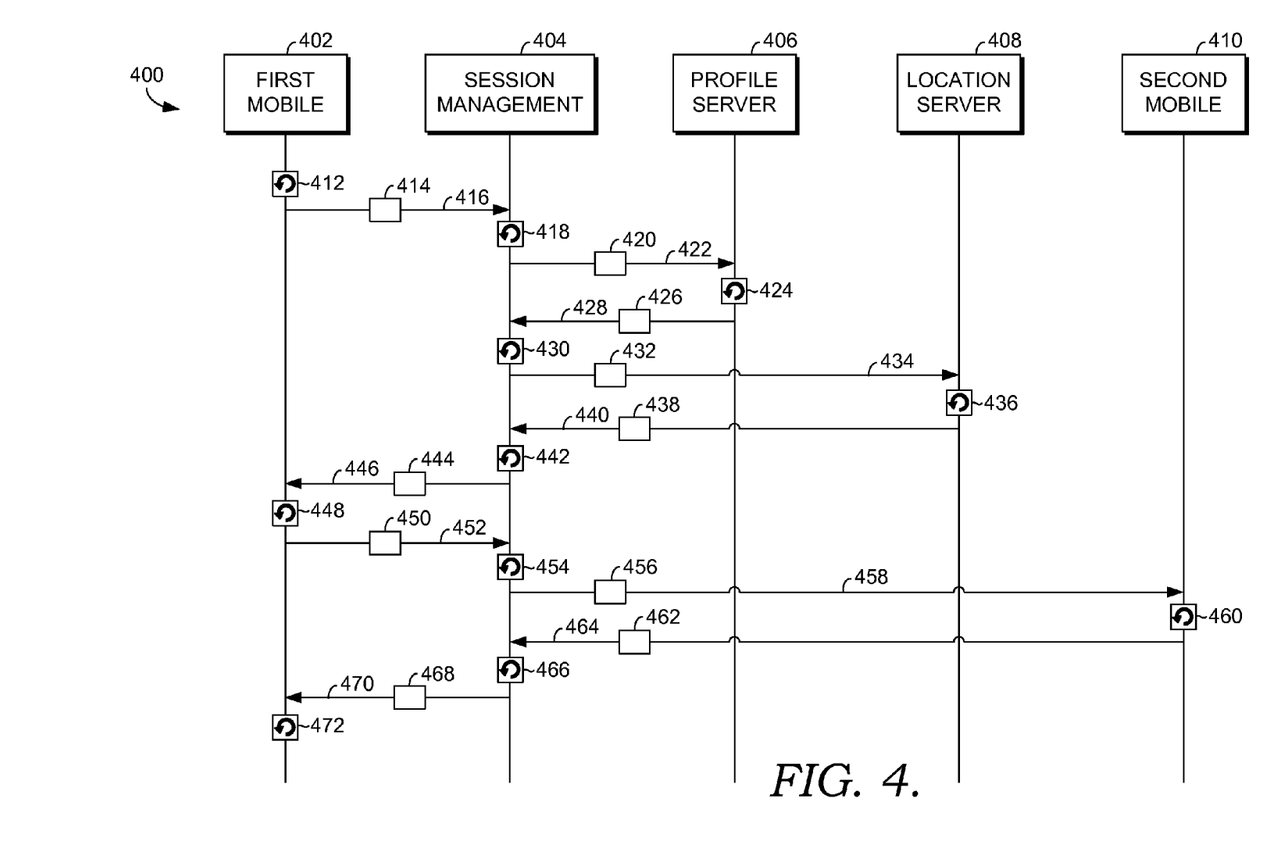
FIG. 4 is a further process flow diagram of a process for initiating anonymous communication between a first mobile device and a second mobile device, in accordance with an embodiment of the present invention.

FIG. 4 is a further process flow diagram 400 of a process for initiating anonymous communication between a first mobile device and a second mobile device, in accordance with an embodiment of the present invention. Initially, first mobile device 402 generates 412 an anonymous communication request 414. First mobile device 402 transmits 416 anonymous communication request 414 to session management node 404. In embodiments, anonymous communication request 414 includes search criteria provided by a first user associated with first mobile device 402. The search criteria may be used to determine a second user associated with second mobile device 410.

Once session management node 404 receives 418 search criteria from first mobile device 402, session management node 404 generates 418 a profile query 420. Profile query 420 is transmitted 422 to profile server 406 where profile server 406 is queried 424 to find a second user matching the search criteria provided by the first user associated with first mobile device 402. In alternative embodiments, a plurality of users matching at least a portion of the search criteria may be determined 424 by profile server 406. In embodiments, the plurality of users may then be filtered based on preferences of the first user associated with the first mobile device 402. For example, the first user may prefer to talk with a stranger who is close in age to the first user. As such, the second user may be identified from a plurality of users, either at the profile server 406, at the session management node 404, at the first mobile device 402, or at a combination of the above.

Once a second user has been identified 424, profile server 406 generates 424 a profile query response 426 that includes identifying information about the second user. The profile query response 426 is transmitted 428 to session management node 404. Additionally, session management node 404 may generate 430 a location query 432. Location query 432 is transmitted 434 to location server 408 where location server 408 is queried 436 to find a further user matching the search criteria provided by the first user associated with first mobile device 402. Once a further user has been identified 436, location server 408 generates 436 a query response 438 that includes identifying information about the further user. The query response 438 is transmitted 440 to session management node 404.

At 442, a message 444 is generated, the message comprising the users determined from queries to profile server 406 and location server 408. Further, message 444 is transmitted 446 to first mobile device 402. At 448, message 444 is received. Further, the first user associated with first mobile device 402 may choose from among the users to determine a second user. In alternative embodiments, an algorithm at first mobile device 402 may decide a second user based on user preferences associated with first mobile device 402. Further, response 450 is generated 448 at first mobile device 402. Response 450 is transmitted 452 to session management node 404.

At 454, session management node 404 initiates a call request 456 that is communicated 458 to second mobile device 410 associated with the second user. In response, a call response 462 is generated 460 at second mobile device 410. The call response 462 includes information that the second user associated with second mobile device 410 accepts the call request 456 from session management node 404. In alternative embodiments, the second user may decline to participate in a call. Call response 462 is then transmitted 464 to session management node 404. At 466, session management node 402 generates a call request 468. Call request 468 is transmitted 470 to first mobile device 402. At 472, first mobile device 402 accepts the call request 468.

Figure 5:
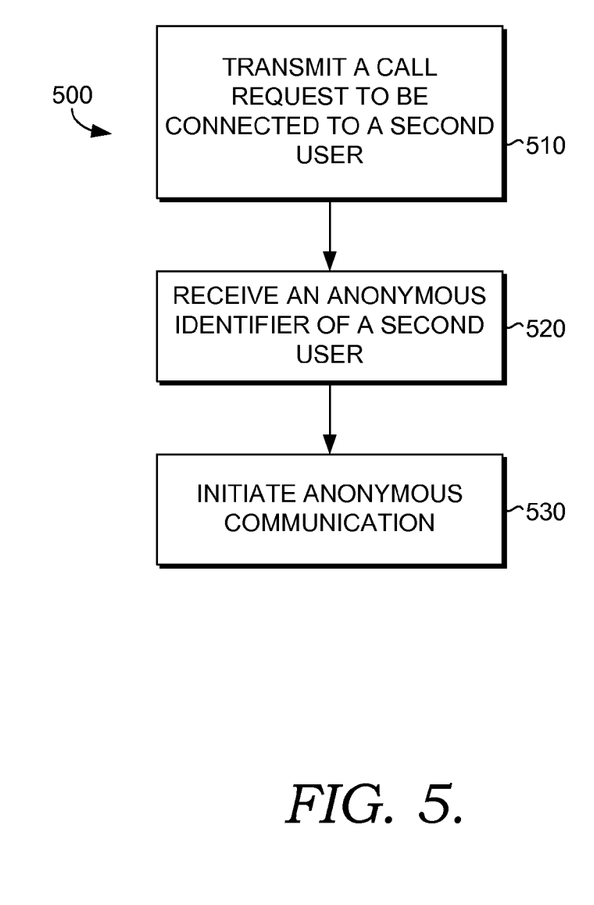
FIG. 5 is a flow diagram of a process for initiating anonymous communication between a first user and a second user, in accordance with an embodiment of the present invention.

FIG. 5 is a flow diagram 500 of a process for initiating anonymous communication between a first user (202) and a second user (208), in accordance with an embodiment of the present invention. At block 510, a call request (212) to be connected to a second user (208) is transmitted (214). In particular, the call request (212) may be transmitted (214) from a first user (202) to a session management node (204). The call request (212) to be connected to a second user (208) may additionally include a request that the second user (208) match a first set of criteria provided by the first user (202). In particular, the request that the second user match the first set of criteria may be met by the second user matching a portion of the first set of criteria. Further, the call request may include the first set of criteria provided by the first user.

At block 520, an anonymous identifier (426) of a second user (410) is received (430). In particular, the anonymous identifier (426) of the second user (410) may be received (430) at the session management node (404). Further, the anonymous identifier (426) of the second user (410) may be received (430) in response to a query (420) generated (418) by the session management node (404) to request information from a profile server (406). Additionally, the second user (410) is determined (424) based on the second user (410) matching the first set of criteria. In particular, the second user (410) may be determined (424) at the profile server (406). In alternative embodiments, a plurality of anonymous identifiers of a plurality of users may be received. Additionally, the plurality of anonymous identifiers may be provided to the first user. In embodiments, the first user or the session management node may determine a second user from the plurality of anonymous identifiers. When selected (448) by the first user (402), the anonymous identifier (450) of the second user (410) may be provided (452) to the session management node (404). Once the second user (410) is determined (448), at block 530, anonymous communication is initiated (456) between the first user (402) and the second user (410).

Figure 6:
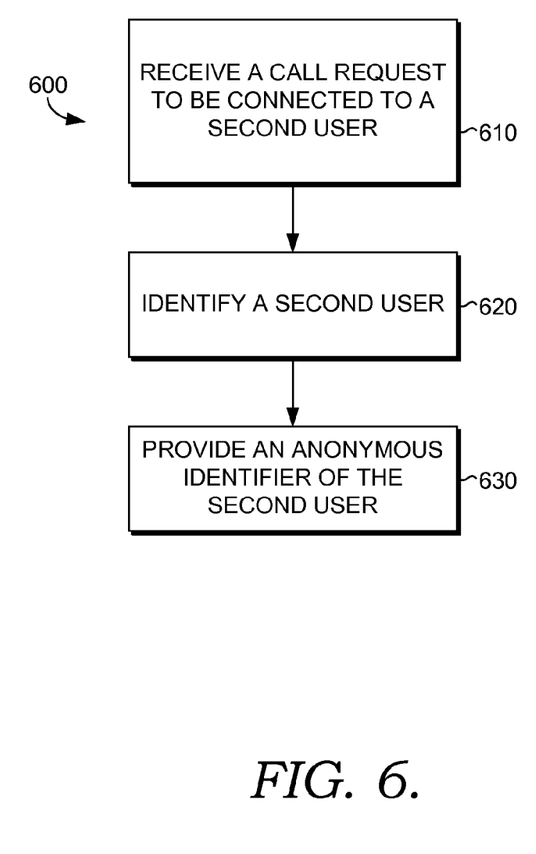
FIG. 6 is another flow diagram of a process for initiating anonymous communication between a first user and a second user, in accordance with an embodiment of the present invention.

FIG. 6 is another flow diagram 600 of a process for initiating anonymous communication between a first user (202) and a second user (208), in accordance with an embodiment of the present invention. At block 610, a call request (212) to be connected to a second user (208) is received from a first user (202). The call request (212) may include a first set of criteria provided by the first user (202). In embodiments, a profile server (206), a location server, or both, may be queried based on the first set of criteria. Further, information (236) may be received (238) in response to querying (230) the profile server (206), location server, or both. Accordingly, information (236) received (238) from the profile server (206), the location server, or both may be used in determining the second user (208). At block 620, a second user (208) is identified (234). In particular, the second user (208) matches the first set of criteria. At block 630, an anonymous identifier (444) of the second user (410) is provided (446). In particular, the anonymous identifier (444) of the second user (410) is provided (446) to the first user (402) to be used in initiating anonymous communication between the first user (402) and the second user (410).

Figure 7:
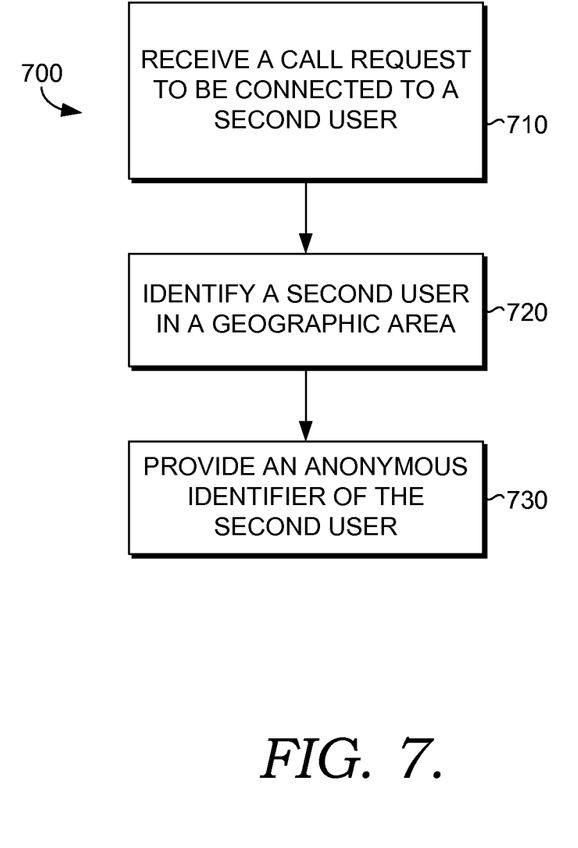
FIG. 7 is a further flow diagram of a process for initiating anonymous communication between a first user and a second user, in accordance with an embodiment of the present invention.

FIG. 7 is a further flow diagram 700 of a process for initiating anonymous communication between a first user (202) and a second user (208), in accordance with an embodiment of the present invention. At block 710, a call request (212) is received (216) from a first user (202) within a first geographic area to be connected to a second user (208) in a second geographic area. The request (212) may include a further request that the second user (208) match a first set of criteria provided by the first user (202). At block 720, a second user (208) in the second geographic area is identified (234). In particular, the second user (208) in the second geographic area is identified as matching the first set of criteria. In embodiments, the second user (208) may be identified (234) as matching the first set of criteria when the second user (208) matches a portion of the first set of criteria. In embodiments, a call request (330) may be transmitted (332) to the second user (308). In particular, the call request (330) may be transmitted (332) from the session management node (304) to the second user (308). Further, the call request (330) may include a query whether the second user (308) is amenable to be placed in anonymous communication with the first user (302). In embodiments, the second user may agree or decline to be placed in anonymous communication with the first caller. At block 730, an anonymous identifier (342) of the second user (308) is provided (344) to the first user (302). In particular, the anonymous identifier (342) of the second user (308) is to be used in initiating anonymous communication between the first user (302) and the second user (308). In embodiments, the anonymous identifier (342) of the second user (308) may be provided (344) to the first user (302) upon receiving (340) an affirmative response (336) to the call request (330) from the second user (308).

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, cause a computing device to perform a method of initiating anonymous communication between a first user device and a second user device, the method comprising:

transmitting, from the first user device, a call request to be connected to another user device matching a first set of criteria provided by the first user device, wherein the first set of criteria comprise characteristics of a vehicle associated with the second user device;

receiving, in the first user device, a message indicating a plurality of anonymous identifiers comprising hidden identities of a plurality of user devices other than the first user device, the plurality of user devices selected based on the plurality of user devices matching the first set of criteria;

receiving a user selection of the second user device from among the plurality of user devices by receiving a selection of one of the plurality of anonymous identifiers corresponding to the second user device; and transferring, from the first user device, an anonymous communication request for an anonymous communication session with the second user device wherein the anonymous communication request indicates the one of the plurality of anonymous identifiers corresponding to the second user device and a request of the first user device for information from the second user device comprising a description of a question for the information.

2. The computer-readable media of claim 1, wherein the first set of criteria is provided by the first user device within the call request.

3. The computer-readable media of claim 1, wherein matching the first set of criteria comprises matching a portion of the first set of criteria.

4. The computer-readable media of claim 1, wherein transferring the anonymous communication request comprises transferring the anonymous communication request for receipt by a session management node.

5. One or more non-transitory computer-readable media having computer-executable instructions embodied thereon that, when executed, cause a computing device to perform a method of initiating anonymous communication between a first user device and a second user device, the method comprising:

receiving, transferred by the first user device, a call request to be connected to another user device matching a first set of criteria provided by the first user device, wherein the first set of criteria comprise characteristics of a vehicle associated with the second user device;

identifying a plurality of user devices other than the first user device that match the first set of criteria; and transferring a message indicating anonymous identifiers of the plurality of user devices comprising hidden identities of the plurality of user devices for delivery to the first user device to be used in initiating anonymous communication between the first user device and ones of the plurality of user devices;

receiving, transferred by the first user device, an anonymous communication request for an anonymous communication session with the second user device, the anonymous communication request indicating one of the plurality of anonymous identifiers corresponding to the second user device and a request of the first user device for information from the second user device comprising a description of a question for the information.

6. The computer-readable media of claim 5, wherein the first set of criteria is provided by the first user device within the call request.

7. The computer-readable media of claim 5, wherein matching the first set of criteria comprises matching a portion of the first set of criteria.

8. The computer-readable media of claim 5, further comprising:

querying a location server based on the first set of criteria.

9. The computer-readable media of claim 8, further comprising:

receiving information in response to querying the location server indicating the plurality of user devices.

10. One or more non-transitory computer-readable media having computer-executable instructions embodied thereon that, when executed, cause a computing device to perform a method of initiating anonymous communication between a first user device and a second user device, the method comprising:

receiving, transferred by the first user device within a first geographic area, a call request to be connected to another user device within a second geographic area, the other user device matching a first set of criteria provided by the first user device, wherein the first set of criteria comprise characteristics of a vehicle associated with the second user device;

identifying a plurality of user devices other than the first user device in the second geographic area that match the first set of criteria; and transferring a message indicating anonymous identifiers comprising a hidden identities of the plurality of user devices for delivery to the first user device to be used in initiating anonymous communication between the first user device and ones of the plurality of user devices;

receiving, transferred by the first user device, an anonymous communication request for an anonymous communication session with the second user device wherein the anonymous communication request indicates one of the plurality of anonymous identifiers corresponding to the second user device and a request of the first user device for information from the second user device comprising a description of a question for the information.

11. The computer-readable media of claim 10, wherein the first set of criteria is provided by the first user device within the call request.

12. The computer-readable media of claim 10, wherein matching the first set of criteria comprises matching a portion of the first set of criteria.

13. The computer-readable media of claim 10, further comprising:

querying a profile server based on the first set of criteria.

14. The computer-readable media of claim 13, further comprising:

receiving information in response to querying the profile server.

* * * * *